Figure 7:
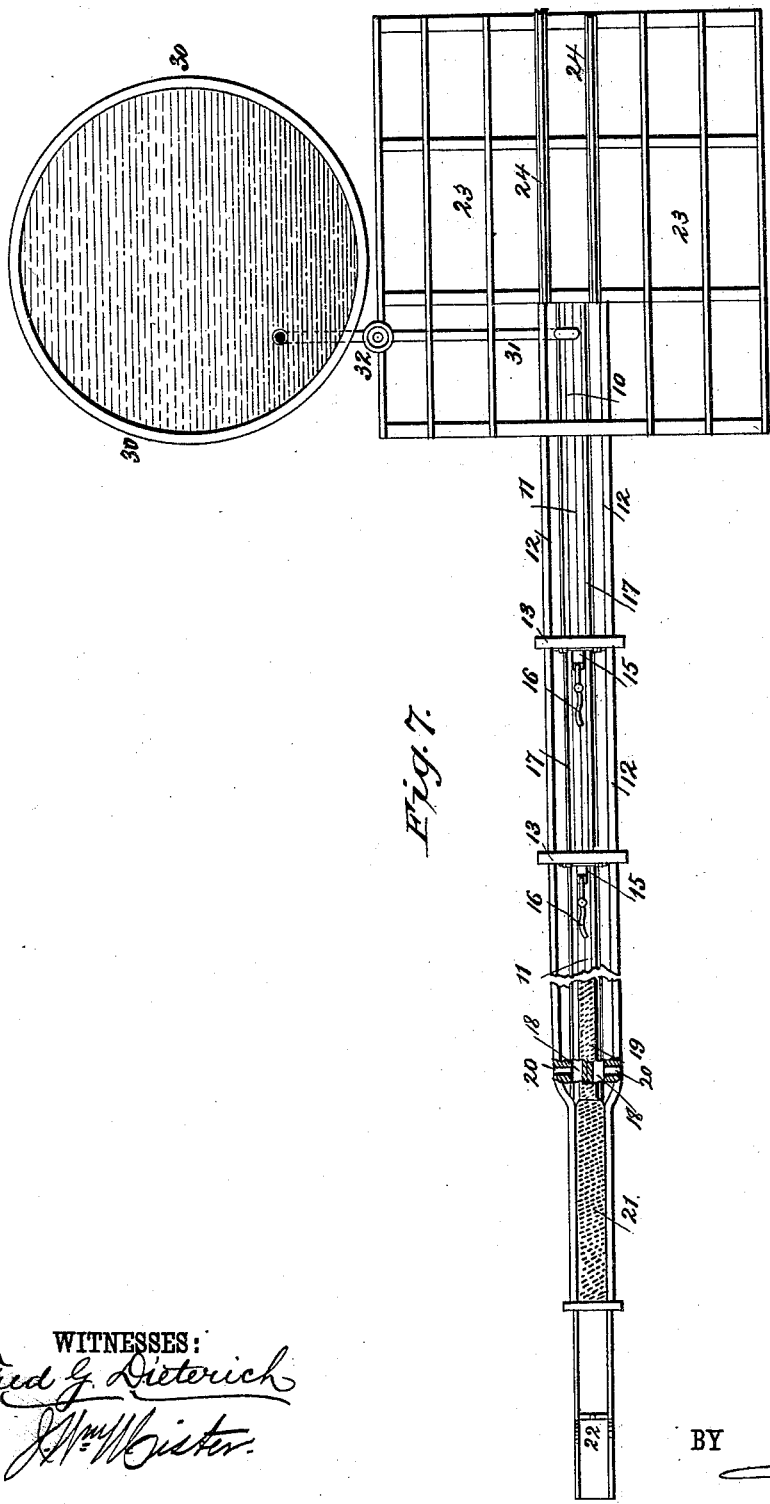

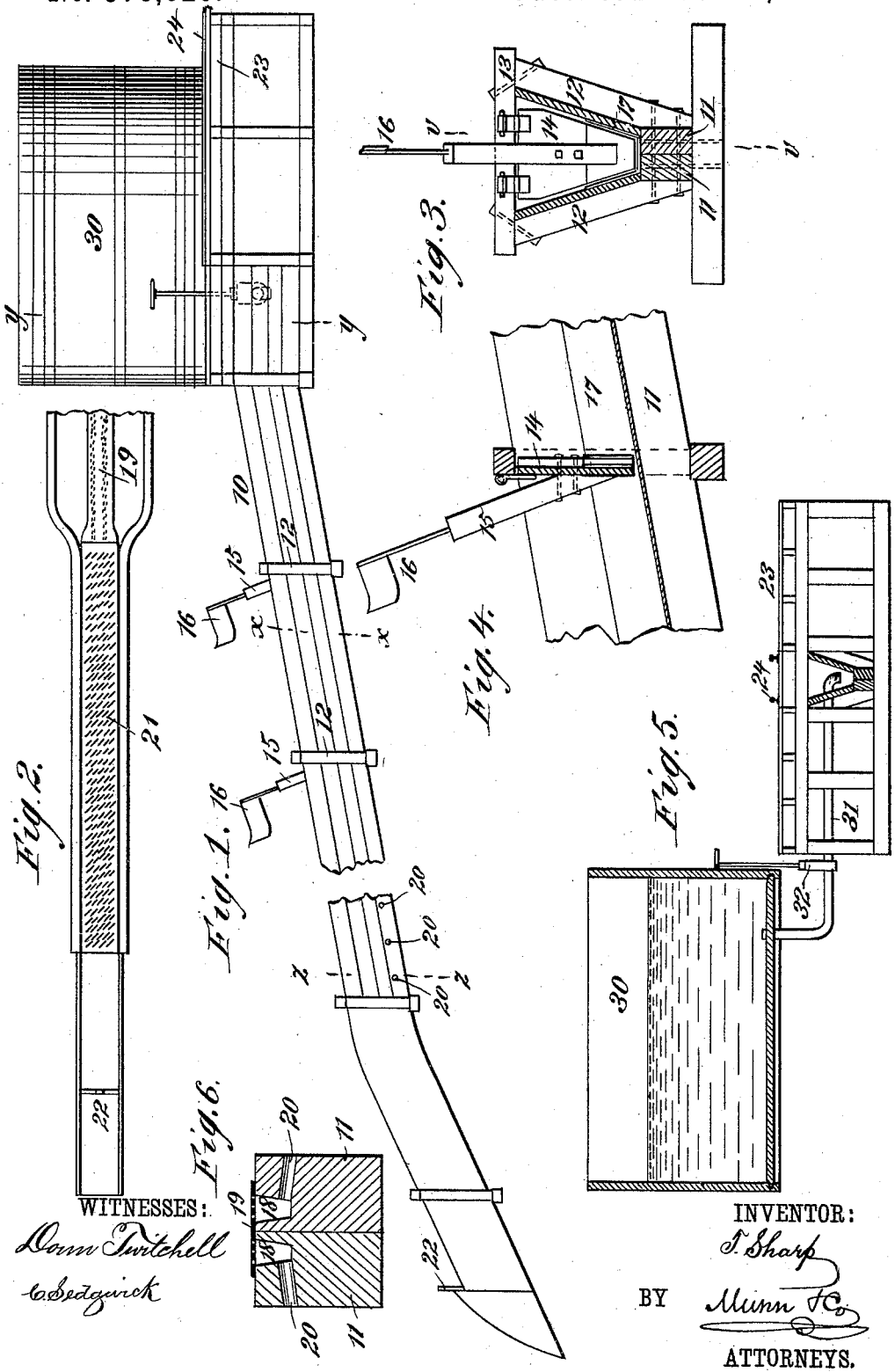

(No Model.) 2 Sheets—Sheet 2.

T. SHARP.
ORE WASHER.

No. 378,626. Patented Feb. 28, 1888.

WITNESSES:
Fred G. Dieterich

INVENTOR:
T. Sharp
BY Munn & Co.
ATTORNEYS.

UNITED STATES PATENT OFFICE.

THOMAS SHARP, OF NASHVILLE, TENNESSEE.

ORE-WASHER.

SPECIFICATION forming part of Letters Patent No. 378,626, dated February 28, 1888.

Application filed January 24, 1887. Serial No. 225,300. (No model.)

*To all whom it may concern:*

Be it known that I, THOMAS SHARP, of Nashville, in the county of Davidson and State of Tennessee, have invented a new and Improved Ore-Washer, of which the following is a full, clear, and exact description.

This invention relates to a novel form of ore-washer that is more especially applicable for use in the washing of ores that are embedded in a clay matrix, the invention consisting, essentially, of a water-supply tank, a water-regulating attachment, a chute provided with counterbalanced swinging barriers or gates, and a means for discharging the water above the lower end of the chute, as will be hereinafter more fully described, and specifically pointed out in the claims.

Reference is to be had to the accompanying drawings, forming a part of this specification, in which similar figures of reference indicate corresponding parts in all the views.

Figure 1 is a side view of a portion of my improved ore-washing apparatus. Fig. 2 is a plan view of the lower portion of the chute. Fig. 3 is a cross-sectional view upon an enlarged scale, the view being taken upon the line *x x* of Fig. 1. Fig. 4 is a partial longitudinal sectional view taken upon the line *v v* of Fig. 3. Fig. 5 is a cross-sectional view of the chute and water-supply tank, the view being taken upon the line *y y* of Fig. 1; and Fig. 6 is an enlarged detail view of the lower timbers of the lower portion of the chute, the view being taken upon the line *z z* of Fig. 1. Fig. 7 is a general plan view of my invention.

In constructing such an apparatus as the one illustrated in the drawings above referred to, I provide a chute, 10, that is preferably about three feet deep and two and a half feet wide at the top, tapering to a width of eight inches at the bottom; but of course chutes of other size and form could be employed without departing from the spirit of my invention.

The bottom of the chute is preferably formed by uniting two heavy timbers, 11, the side walls being supported and held from bulging by side bracing-strips, 12, and top cross-bars, 13, all parts being firmly bolted together, as indicated in Fig. 3. The bracing-frames, made up of the side bars, 12, and top cross-bars, 13, are preferably located at points about twelve feet apart throughout the length of the chute, and to the lower sides of these top cross-bars, 13, there are hinged gates or barriers 14, that are formed to fit within the chute and bar or impede the passage of the material delivered to the chute. These gates or barriers 14 are provided with counterbalancing-timbers 15, which are preferably provided with indicating-flags 16.

The bottom and side walls are lined to a height of eighteen inches or more with steel plates 17, and the timbers 11 of the lower sections of the chute are formed with longitudinal water passages or ways 18, above which ways there is arranged a metallic screening-plate, 19, discharge-passages 20 leading from the water-ways 18, as best shown in Fig. 6.

Below the section in connection with which the screening-plates 19 are arranged the chute is contracted in width, and the bottom of this contracted portion is formed with a coarser screening-plate, 21, to effect the concentration and passing off of the clay or other foreign substances separated from the ore, and a sliding gate or barrier, 22, is located near the extreme lower end of the chute. The upper end of the chute passes beneath a platform, 23, upon which there are laid tramway-rails 24, and in close proximity to this platform there is a water-supply tank, 30, that is arranged to deliver water to the chute through a supply-pipe, 31, a water gate or valve, 32, being arranged in connection with the supply-pipe, as best shown in Fig. 5.

Such being the general construction of my improved ore-washing apparatus, the operation is as follows: Ore having been delivered to the upper open end of the chute by means of cars drawn upon the platform 23, a supply of water is discharged into the chute through the pipe 31, the amount of water being regulated to suit the requirements of the case—that is, if a large amount of clay is delivered with the ore, the supply of water would be increased—sufficient water being always supplied in order that the clay may be dissolved and washed away from the ore. As the ore passes down the chute its progress will be stopped or hindered by the barriers or gates 14, the weight and length of the timbers 15 being regulated so as to properly adjust the resistance offered to the downward passage of the material within the chute, the position of each of the barriers being indicated by the sight-flags 16, thereby enabling the attendants to properly regulate the flow of the material within the chute. Upon reaching the plates 19 and 21 the water will pass downward and into the water-ways 18, to be passed off through the discharge-openings 20, the clay being carried away with the water, while the cleaned ore passes onward to the lower section of the chute, to be delivered to cars that are located in a position to receive the discharge from the chute.

Such an apparatus as has been described will not only effectually clean the ore, but will materially decrease the expense of the cleaning.

Having thus fully described my invention, I claim as new and desire to secure by Letters Patent—

1. The combination, with the water-supply tank, of the inclined chute having pipe-connection with said tank and contracted in width at its lower portion, said chute having in its bottom passages, over which, within the greater width of chute, is arranged a screening-plate having openings or mesh, and a second screening-plate of coarser mesh arranged in the contracted portion of the chute, said passages having lateral discharge-outlets, substantially as set forth.

2. The combination, with the water-supply tank, of the chute having pipe-connection with said tank and inclined at a certain angle for a portion of its length and at a greater angle for the rest of its length, said chute having its bottom provided with passages having lateral discharge-outlets, and covered in the wider portion of the chute with a screening-plate having fine openings and in the contracted or narrower portion of the chute with a screening-plate having a coarser mesh, and swinging barriers or gates arranged in said chute, substantially as set forth.

THOMAS SHARP.

Witnesses:
JAMES GEDDES,
O. RUDE.